(12) United States Patent
Mc Lain

(10) Patent No.: US 7,536,851 B2
(45) Date of Patent: May 26, 2009

(54) CATALYST CONDITION MONITOR BASED ON DIFFERENTIAL AREA UNDER THE OXYGEN SENSORS CURVE ALGORITHM

(75) Inventor: Kurt D. Mc Lain, Ortonville, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 12 days.

(21) Appl. No.: 11/077,527

(22) Filed: Mar. 10, 2005

(65) Prior Publication Data

US 2006/0201138 A1    Sep. 14, 2006

(51) Int. Cl.
*F01N 3/00* (2006.01)

(52) U.S. Cl. ............... 60/277; 60/274; 60/276; 60/285

(58) Field of Classification Search ........... 60/286, 60/287, 274, 276, 277, 285
See application file for complete search history.

(56) References Cited

U.S. PATENT DOCUMENTS

| | | | | | |
|---|---|---|---|---|---|
| 3,969,932 | A | * | 7/1976 | Rieger et al. | 73/118.1 |
| 5,077,970 | A | * | 1/1992 | Hamburg | 60/274 |
| 5,390,490 | A | * | 2/1995 | Brooks | 60/276 |
| 5,416,710 | A | * | 5/1995 | Kuroda et al. | 701/104 |
| 5,743,086 | A | * | 4/1998 | Nagai | 60/276 |
| 5,749,222 | A | * | 5/1998 | Nakajima et al. | 60/274 |
| 6,050,128 | A | * | 4/2000 | Hamburg et al. | 73/23.32 |
| 6,073,440 | A | * | 6/2000 | Douta et al. | 60/277 |
| 6,295,807 | B1 | * | 10/2001 | Douta et al. | 60/274 |
| 6,497,092 | B1 | * | 12/2002 | Theis | 60/274 |
| 6,594,986 | B2 | * | 7/2003 | Ingram et al. | 60/277 |
| 6,799,419 | B2 | * | 10/2004 | Rosel et al. | 60/277 |

* cited by examiner

*Primary Examiner*—Thomas E Denion
*Assistant Examiner*—Diem Tran

(57) ABSTRACT

A control system and method of monitoring a condition of a catalyst in a catalytic converter includes commanding a first air/fuel ratio. A first signal is monitored from a first oxygen sensor and a second signal from a second oxygen sensor. A second air/fuel ratio is commanded. A first time is determined based on the first oxygen sensor reaching a first threshold voltage. A second time is determined based on the second oxygen sensor reaching a second threshold voltage. A differential area defined by the first and second signals between the first and second times is calculated.

19 Claims, 3 Drawing Sheets

CATALYST CONDITION MONITOR BASED ON DIFFERENTIAL AREA UNDER THE OXYGEN SENSORS CURVE ALGORITHM

FIELD OF THE INVENTION

The present invention relates to engine control systems for vehicles, and more particularly to a diagnostic system that monitors a condition of a catalyst in a catalytic converter.

BACKGROUND OF THE INVENTION

Catalytic converters reduce exhaust gas emissions in vehicles using an internal combustion engine. A three-way catalytic converter includes a substrate with a coating of catalyst materials that stimulate the oxidation of hydrocarbon and carbon monoxide and the reduction of nitrogen oxides in the exhaust gas. The catalysts operate optimally when the temperature of the catalysts is above a minimum level and when the air/fuel ratio is stoichiometric. Stoichiometry is defined as an ideal air/fuel ratio, which is 14.7 to 1 for gasoline. An air/fuel ratio referred to as "rich" is typically associated with a ratio less than stoichiometric. Likewise an air/fuel ratio referred to as "lean" is typically associated with a ratio greater than stoichiometric.

In one vehicle configuration, first and second oxygen sensors are located in a vehicle exhaust. The first oxygen sensor is positioned in an upstream location relative to the catalytic converter. The second oxygen sensor is positioned in a downstream location relative to the catalytic converter. These oxygen sensors measure the oxygen content of the exhaust. In general, the efficiency of a catalytic converter is based on its ability to hold a charge of oxygen for a given period of time.

One method of determining the efficiency of the catalytic converter is to measure the time difference it takes for the oxygen content in the exhaust to reach a predetermined threshold in response to a commanded air/fuel ratio. The efficiency of a catalytic converter is proportional to this time difference. More specifically, as the time difference increases, the ability of the catalytic converter to hold a charge of oxygen increases.

In one approach, a lean air/fuel ratio is commanded. The downstream oxygen sensor is monitored and the time difference between the commanded time and the threshold time is determined. This time difference is considered to determine the ability of the catalytic converter to hold a charge of oxygen.

SUMMARY OF THE INVENTION

A control system and method of monitoring a condition of a catalyst in a catalytic converter includes commanding a first air/fuel ratio. A first signal is monitored from a first oxygen sensor and a second signal from a second oxygen sensor. A second air/fuel ratio is commanded. A first time is determined based on the first oxygen sensor reaching a first threshold voltage. A second time is determined based on the second oxygen sensor reaching a second threshold voltage. A differential area defined by the first and second signals between the first and second times is calculated.

According to other features, commanding the first air/fuel ratio includes commanding a rich air/fuel mixture and commanding the second air/fuel ratio includes commanding a lean air/fuel mixture. Monitoring includes monitoring the first signal from the first oxygen sensor located in an exhaust upstream of the catalytic converter and monitoring the second signal from the second oxygen sensor located in the exhaust downstream of the catalytic converter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
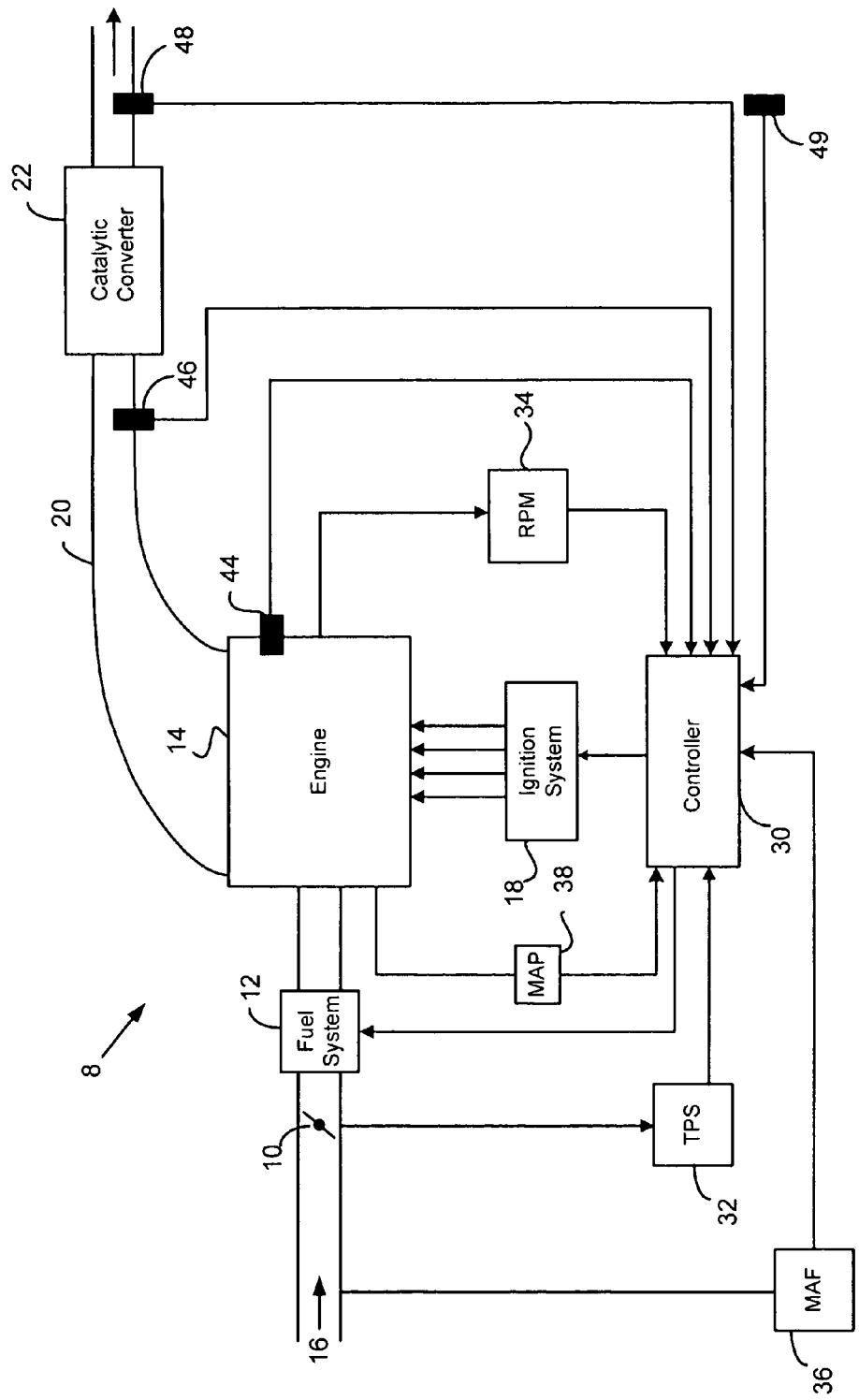
FIG. 1 is a functional block diagram of an engine control system according to the present invention for a vehicle.

Referring to FIG. 1, an exemplary engine control system 8 is shown. A throttle 10 and a fuel system 12 control the air/fuel mixture that is delivered to an engine 14 through an intake 16. An ignition system 18 ignites the air/fuel mixture in the engine 14. Exhaust gas that is created by the combustion of the air/fuel mixture is expelled through an exhaust manifold 20. A catalytic converter 22 receives the exhaust gas from the exhaust manifold 20 and reduces the emissions levels of the exhaust gas.

A control module 30 communicates with various components of the engine control system 8, including but not limited to a throttle position sensor 32 (TPS), the fuel system 12, the ignition system 18, a mass airflow sensor 36 (MAF) and an intake manifold air pressure sensor 38 (MAP). The control module 30 receives a throttle position signal from the TPS 32, a mass airflow signal from the MAF 36 and an intake manifold air pressure signal from the MAP 38. The throttle position signal, the mass airflow signal and the manifold air pressure signal are used to determine air flow into the engine 14. The air flow data is then used to calculate the corresponding fuel to be delivered by the fuel system 12 to the engine 14. The control module 30 further communicates with the ignition system 18 to determine ignition spark timing. Oxygen sensors 46 and 48 are disposed in the exhaust 20 upstream and downstream, respectively, of the catalytic converter 22. The oxygen sensors 46 and 48 output signals to the control module 30 that represent the oxygen content before and after the catalytic converter 22 in the exhaust 20.

The control module 30 may receive additional feedback from other components in the engine control system 8, including but not limited to coolant temperature from a coolant temperature sensor 44 and engine speed from an engine speed sensor 34 (RPM). The control module 30 may also receive other signals outside the engine control system 8, including but not limited to a vehicle speed signal from a vehicle speed sensor 49. These and other variables may affect the overall performance and behavior of the engine control system 8. The control module 30 utilizes data gathered from the various engine components to monitor and optimize engine performance. In the present invention, a diagnostic control system is implemented to measure the ability of the catalytic converter 22 to hold a charge of oxygen.

Figure 2:
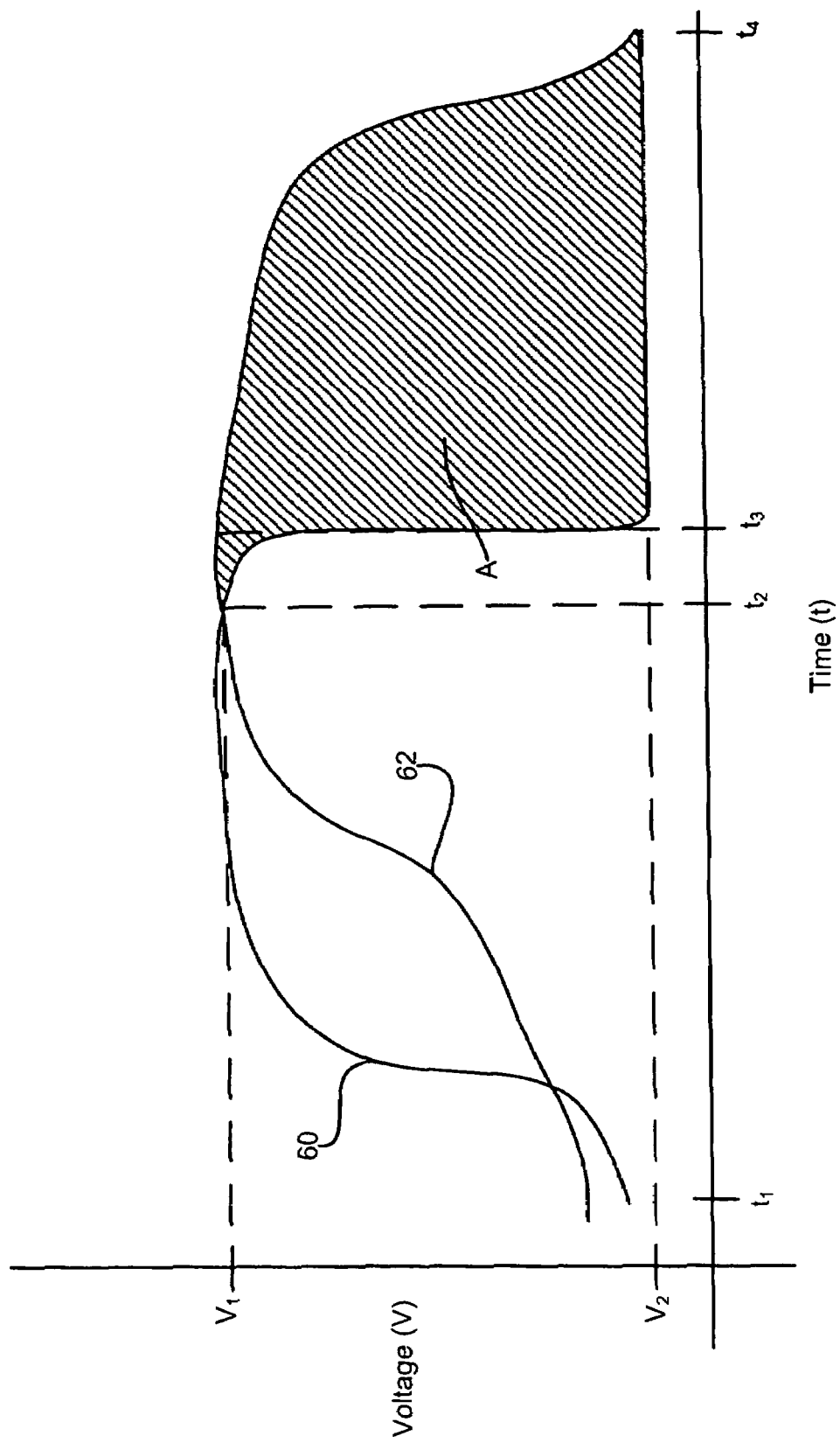
FIG. 2 is an exemplary voltage versus time plot of an upstream and downstream oxygen sensor according to the present invention.

With reference to FIG. 2, the control module 30 monitors an upstream signal 60 and a downstream signal 62 communicated by the upstream oxygen sensor 46 and the downstream oxygen sensor 48, respectively. The signals 60 and 62 communicate a voltage (V) over a time (t). The voltage represents oxygen content measured in the exhaust 20 at the upstream and downstream oxygen sensors 46 and 48. Skilled artisans will appreciate that while the exemplary oxygen sensors 46 and 48 are voltage sensors, other signals such as current signals, digital signals, etc., may be communicated to represent the oxygen content.

As will be described, a first threshold voltage $V_1$ is attained when the upstream oxygen sensor 46 reaches an upstream threshold voltage. A second threshold voltage $V_2$ is attained when the downstream oxygen sensor 48 reaches a downstream threshold voltage. The first and second threshold voltage $V_1$ and $V_2$ are attained by commanding the air/fuel mixture rich at a first time $t_1$ and commanding an air/fuel mixture lean at a second time $t_2$. A rich air/fuel mixture influences the upstream signal 60 to initially increase in voltage from the first time $t_1$ to a second time $t_2$. As a result, the downstream oxygen sensor 48 has a delayed response that generates a downstream signal 62 that increases in voltage from the first time $t_1$ to the second time $t_2$.

At the second time $t_2$, a lean air/fuel mixture is commanded. The upstream signal 60 decreases in voltage from the second time $t_2$ to a fourth time $t_4$ The downstream signal 62 lags the upstream signal and decreases in voltage to the second threshold voltage $V_2$ at the fourth time $t_4$. A third time $t_3$ represents the first threshold voltage $V_1$ and the fourth time $t_4$ represents the second threshold voltage $V_2$. A differential area A is calculated between the upstream and downstream signals 60 and 62 from the third time $t_3$ to the fourth time $t_4$. The differential area A represents an oxygen charge ($V_1$ to $V_2$) provided by the catalytic converter 22 over a time ($t_3$ to $t_4$). The control module 30 may subsequently compare the area A to a predetermined value representative of an emissions passing converter and other thresholds representing gradual performance levels.

Figure 3:
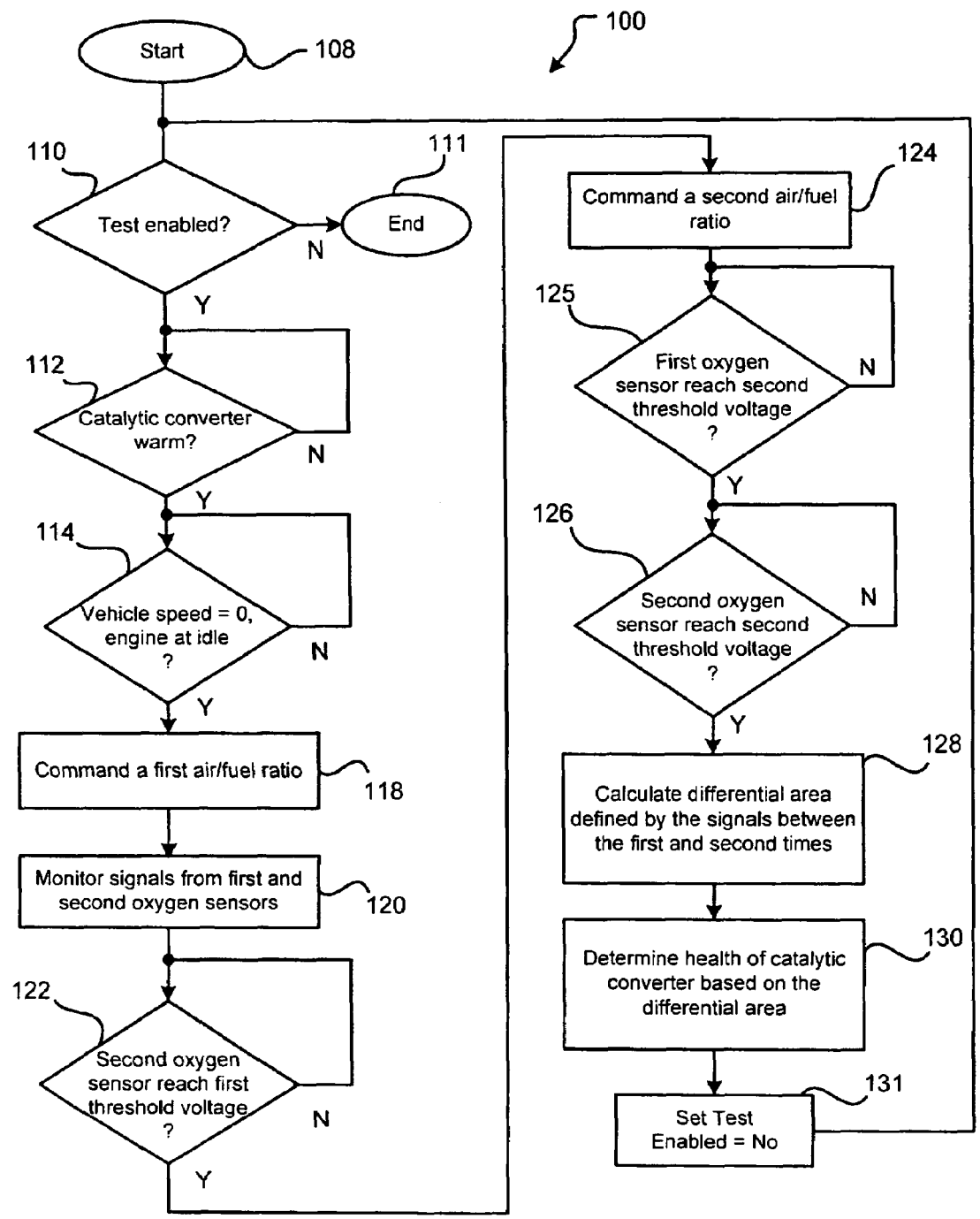
FIG. 3 is a flow diagram illustrating steps for monitoring the condition of a catalytic converter according to the present invention.

With continued reference to FIGS. 1 and 2 and further reference to FIG. 3, a method for monitoring a condition of a catalyst in a catalytic converter is shown and generally identified at 100. Control begins with step 108. In step 110, control determines if the diagnostic test is enabled. If the test is not enabled, control ends in step 111. If the test is enabled, control determines if the catalytic converter 22 has reached operating temperature in step 112. If the catalytic converter 22 has not reached operating temperature, control loops to step 112. If the catalytic converter 22 is sufficiently warm, control determines if vehicle speed equals zero and the engine 14 is idling in step 114. Vehicle speed may be determined by the vehicle speed sensor 49 for example. If vehicle speed does not equal zero and/or the engine 14 is not idling, control loops to step 114. If vehicle speed equals zero and the engine 14 is idling, control commands a first air/fuel ratio in step 118. The first air/fuel ratio according to the exemplary plot in FIG. 2 is a rich air/fuel ratio commanded at a time $t_1$.

In step 120, the upstream and downstream signals 60 and 62 are monitored. In step 122, control determines if the downstream signal 62 equals a first threshold voltage ($V_1$). The first threshold voltage ($V_1$) is a predetermined voltage that represents the downstream oxygen sensor 48 communicating a sufficiently high voltage. A sufficiently high voltage may be any suitable voltage representative of the catalytic converter 22 responding to a commanded air/fuel ratio. If not, control loops to step 122. In step 124 a second air/fuel mixture is commanded. The second air/fuel ratio according to the exemplary plot in FIG. 2 is a lean air/fuel ratio commanded at a time $t_2$. In step 125 control determines if the upstream signal 60 has reached a second threshold voltage $V_2$. If the downstream signal 60 has not reached a second threshold voltage $V_2$ control loops to step 125. In step 126 control determines if the downstream signal 62 has reached a second threshold voltage $V_2$. If the downstream signal 62 has not reached a second threshold voltage $V_2$ control loops to step 126. If the downstream signal 62 has reached a second threshold voltage $V_2$ control calculates the differential area defined by the upstream and downstream signals 60 and 62 over times $t_3$ and $t_4$ in step 128. It is appreciated that while the upstream and downstream signals 60 and 62 are shown to converge at the second threshold voltage $V_2$ at time $t_4$ in the exemplary plot of FIG. 2, the signals may not necessarily converge.

In step 130 the efficiency, or the ability of the catalytic converter to hold a charge of oxygen, is determined based on the differential area A. In step 131 test is disabled. Control then loops to step 110. The differential area A may be compared to a threshold representing a failure mode. In one example, the differential area A may result in one of a passing or failing value. A failing value may be used to initiate a fault code or lamp on an instrument panel (not shown) of the vehicle 8. In another example, the differential area A may be used to determine an efficiency or other operational parameter of the catalytic converter. Skilled artisans will appreciate that a compensation factor may be considered when determining the condition of the catalytic converter 22. The compensation factor may account for various conditions such as, but not limited to temperature of the catalytic converter 22, load on the engine 14 and air flow through the exhaust 20.

The method 100 of FIG. 3 provides intrusive diagnostic steps identified from steps 118 to 131. Steps 112 and 114 provide a preliminary check of the operating conditions of the catalytic converter 22 and the vehicle 10 as a whole. Skilled artisans will appreciate that additional or fewer preliminary checks may be employed by the control module 30 prior to initiating the intrusive diagnostic steps.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of monitoring a condition of a catalyst in a catalytic converter of an internal combustion engine, comprising:

determining whether the engine is operating at idle;

commanding a first air/fuel ratio when the engine is operating at idle;

monitoring a first signal from a first oxygen sensor and a second signal from a second oxygen sensor;

commanding a second air/fuel ratio when the engine is operating at idle;

determining a first time based on said first oxygen sensor reaching a first threshold voltage in response to said commanded first air/fuel ratio;

determining a second time based on said second oxygen sensor reaching a second threshold voltage in response to said commanded second air/fuel ratio;

monitoring said first and second signals to acquire a respective first and second plurality of sample voltages between said first and second times;

calculating a differential area based on said monitoring; and determining the condition of the catalyst based on the differential area calculation.

2. The method of claim 1 wherein commanding said first air/fuel ratio comprises:

commanding a rich air/fuel mixture.

3. The method of claim 1 wherein monitoring comprises:

monitoring said first signal from said first oxygen sensor located in an exhaust upstream of said catalytic converter; and monitoring said second signal from said second oxygen sensor located in said exhaust downstream of said catalytic converter.

4. The method of claim 3 wherein monitoring said first signal comprises monitoring a first oxygen content at said first oxygen sensor over a period of time and wherein monitoring said second signal comprises monitoring a second oxygen content at said second oxygen sensor over a period of time.

5. The method of claim 1 wherein commanding said second air/fuel ratio comprises:

commanding a lean air/fuel ratio.

6. The method of claim 1, further comprising comparing said differential area to a threshold.

7. The method of claim 1 wherein calculating the differential area includes continuously monitoring both of the first and second signals from the first time to the second time.

8. A control system for monitoring a condition of a catalyst in a catalytic converter of an internal combustion engine, comprising:

a first oxygen sensor located upstream of the catalytic converter that generates a first signal when the engine is operating at idle;

a second oxygen sensor located downstream of the catalytic converter that generates a second signal when the engine is operating at idle; and a control module that monitors said first and second signals, that determines a first time based on a first threshold voltage attained by said first oxygen sensor in response to said generated first signal, that determines a second time based on a second threshold voltage attained by said second oxygen sensor in response to said generated second signal, that monitors said first and second signals and acquires a respective first and second plurality of sample voltages between said first and second times, that calculates a differential area based on said monitoring, and that determines the condition of the catalyst based on the differential area calculation.

9. The control system of claim 8 wherein the control module continuously monitors both of the first and second signals from the first time to the second time for the differential area calculation.

10. The control system of claim 8 wherein said control module commands a first air/fuel ratio and subsequently commands a second air/fuel ratio.

11. The control system of claim 10 wherein said first air/fuel ratio is rich.

12. The control system of claim 10 wherein said second air/fuel ratio is lean.

13. The control system of claim 11 wherein said first and second oxygen sensors are located in an exhaust.

14. The control system of claim 8 wherein said first and second oxygen sensors communicate a voltage to said control module.

15. The control system of claim 14 wherein said first time occurs during a decreasing voltage communicated from said first oxygen sensor in response to said control module commanding a lean air/fuel ratio.

16. The control system of claim 14 wherein said second time occurs during a decreasing voltage communicated from said second oxygen sensor in response to said control module commanding a lean air/fuel ratio.

17. A method of monitoring a condition of a catalyst in a catalytic converter of an internal combustion engine, comprising:

determining whether the engine is operating at idle;

commanding a rich air/fuel ratio when the engine is operating at idle;

monitoring a first and second signal over a time, said first signal communicated from a first oxygen sensor located upstream of the catalytic converter and said second signal communicated from a second oxygen sensor located downstream of the catalytic converter;

commanding a lean air/fuel ratio when the engine is operating at idle;

determining a first time based on said first oxygen sensor reaching a first threshold voltage in response to said commanded rich air/fuel ratio;

determining a second time based on said second oxygen sensor reaching a second threshold voltage in response to said commanded lean air/fuel ratio;

monitoring said first and second signals to acquire a respective first and second plurality of sample voltages between said first and second times;

calculating a differential area based on said monitoring; and determining the condition of the catalyst based on the differential area calculation.

18. The method of claim 17, further comprising:

comparing said differential area to a threshold; and determining if the catalytic converter has held a charge of oxygen for a sufficient time based on said threshold.

19. The method of claim 17 wherein calculating the differential area includes continuously monitoring both of the first and second signals from the first time to the second time.

* * * * *